(12) United States Patent
Mireles

(10) Patent No.: US 6,247,428 B1
(45) Date of Patent: Jun. 19, 2001

(54) RIGID LEASH SYSTEM FOR WALKING MULTIPLE PETS

(76) Inventor: Tony Mireles, 3145 E. Flamingo Blvd. #1054, Las Vegas, NV (US) 89121

( * ) Notice: Subject to any disclaimer, the term of this patent is extended or adjusted under 35 U.S.C. 154(b) by 0 days.

(21) Appl. No.: 09/492,545

(22) Filed: Jan. 27, 2000

(51) Int. Cl.[7] .................................................. A01K 27/00
(52) U.S. Cl. ............................................. 119/795; 119/771
(58) Field of Search .................................. 119/795, 771, 119/769, 770, 799, 798; D30/151, 153

(56) References Cited

U.S. PATENT DOCUMENTS

| | | | |
|---|---|---|---|
| D. 337,396 | * 7/1993 | Werner | ................. D30/153 |
| 5,080,045 | * 1/1992 | Reese et al. | . |
| 5,551,379 | * 9/1996 | Hart | ................................. 119/771 |
| 5,701,848 | * 12/1997 | Tozawa | ........................... 119/797 |

* cited by examiner

Primary Examiner—Charles T. Jordan
Assistant Examiner—Yvonne R. Abbott

(57) ABSTRACT

Device for controllably walking two (2) or more pets simultaneously. According to a preferred embodiment, the device comprises an elongate shaft portion having proximal and distal ends with a cross bar or portion formed at the distal end thereof to define a generally T-shape. The proximal end of the shaft member is provided with a grip and the opposed ends of the cross-bar member have leashes attachable thereto, the latter being attachable to the collars of the respective pets held thereby. The devices may be formed to assume alternative configurations, namely generally Y or U-shapes.

9 Claims, 3 Drawing Sheets

RIGID LEASH SYSTEM FOR WALKING MULTIPLE PETS

CROSS-REFERENCE TO RELATED APPLICATIONS (Not Applicable).

STATEMENT RE: FEDERALLY SPONSORED RESEARCH/DEVELOPMENT (Not Applicable).

BACKGROUND OF THE INVENTION

The use of leashes to walk dogs and other pets are well-known in the art. In this regard, leashes provide a tether between the pet and the individual walking the pet to thus keep the pet in close proximity and under control. Along these lines, most leashes currently in use comprise elongate cords, comprised of leather, rope, and the like that are attachable at one end to a collar placed around the pet's neck. The respective other end is typically provided with a loop or handle to provide means for grasping and controlling the leash.

While generally effective in restraining the leeway a pet has to stray away from the individual responsible for walking such pet, such conventional leashes have numerous drawbacks. Specifically, most conventional leashes, because of their flexible cord-like nature, enable the pet bound thereby to move in virtually any direction, which may be contrary to the direction desired by the individual walking the pet. This problem is especially exacerbated when more than one pet is walked by a single person. In this regard, multiple leashes can and frequently do become tangled with one another. Moreover, the individual walking such pets has a tendency to lose control insofar as each respective pet rarely tends to follow the exact same direction as the other, which thus requires the individual walking such pets to continuously pull and guide the pets toward an intended direction, often by using both hands. As a result, walking multiple pets with conventional leashes can become tiresome and stressful. Furthermore, pain and injury can be inflicted to the pets themselves because of the need to continuously pull and tug the animal in one continuous direction.

While attempts in the art have been made to modify conventional leashes, such advancements have not addressed the foregoing problems. Perhaps the most well-known of such advances include retractable leashes which enable the length of the leash to be selectively lengthened to thus control the distance by which the pet may stray from the individual walking the same. Such devices, however, do not guide or urge the pet to walk in any particular direction and, likewise, fail to facilitate the handling of one or more additional pets being concurrently walked by a single person.

As such, there is a substantial need in the art for an animal walking device that enables at least two pets to be simultaneously controlled with one mechanism during walking. There is further a need in the art for an animal-walking device that enables at least two animals to be simultaneously and controllably walked in a single direction by a single person. Still further, there is a need in the art for a multiple animal walking device that is of simple construction, easy to use, may be utilized with a variety of animals, is inexpensive to manufacture, and is exceptionally durable.

BRIEF SUMMARY OF THE INVENTION

The present invention specifically addresses and alleviates the above-identified deficiencies in the art. In this regard, the present invention is directed to a multiple pet walker that enables two or more pets to be simultaneously walked by a single person that empowers such person with a greater ability to control such pets, as well as the direction in which the pets walk. According to a preferred embodiment, the device comprises an elongate shaft member having proximal and distal ends in combination with a second cross-bar member, the latter being formed at the distal-most end of the elongate shaft member. The elongate shaft member and cross-bar member are preferably configured such that the same cooperate to define a generally T-shape. Formed on the proximal-most end of the elongate shaft member is a grip member to enable the device to be manually grasped by an individual. On the respective opposed ends of the cross bar are leash members that may be connected to a collar worn about the neck of a given pet, such as a dog.

In alternative preferred embodiments, the device may be formed to have a generally Y-shape or generally U-shape such that the distal end of the device accommodates at least two pets to be attached to a dedicated end thereof. The device of the present invention may further be formed to have a generally forked-shape to thus enable three or more pets to be simultaneously walked and controlled thereby. The device may be fabricated from any of a variety of materials known in the art, including but not limited to wood, metal, and/or plastic. The device of the present invention may further be sized to accommodate animals of varying size.

It is therefore an object of the present invention to provide a multiple pet walker that facilitates the ability to control and handle at least two (2) pets concurrently walked by a single person.

Another object of the present invention is to provide a multiple pet walker that enables a single person to control the direction by which such pets are walked.

Another object of the present invention is to provide a multiple pet walker that can controllably maintain in fixed spatial relation the distance two or more pets may be concurrently walked by a single person.

Another object of the present invention is to provide a multiple pet walker that can be selectively sized and adapted to enable such device to accommodate pets of varying size.

Still further object of the present invention is to provide a multiple pet walker that is of simple construction, easy to use, inexpensive to manufacture, exceptionally durable, and more effective than prior art devices utilized to facilitate walking two or more pets simultaneously.

BRIEF DESCRIPTION OF THE SEVERAL VIEWS OF THE DRAWING

These, as well as other features of the present invention, will become more apparent upon reference to the drawings, wherein.

DETAILED DESCRIPTION OF THE PRESENT EMBODIMENT

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments.

Figure 1:
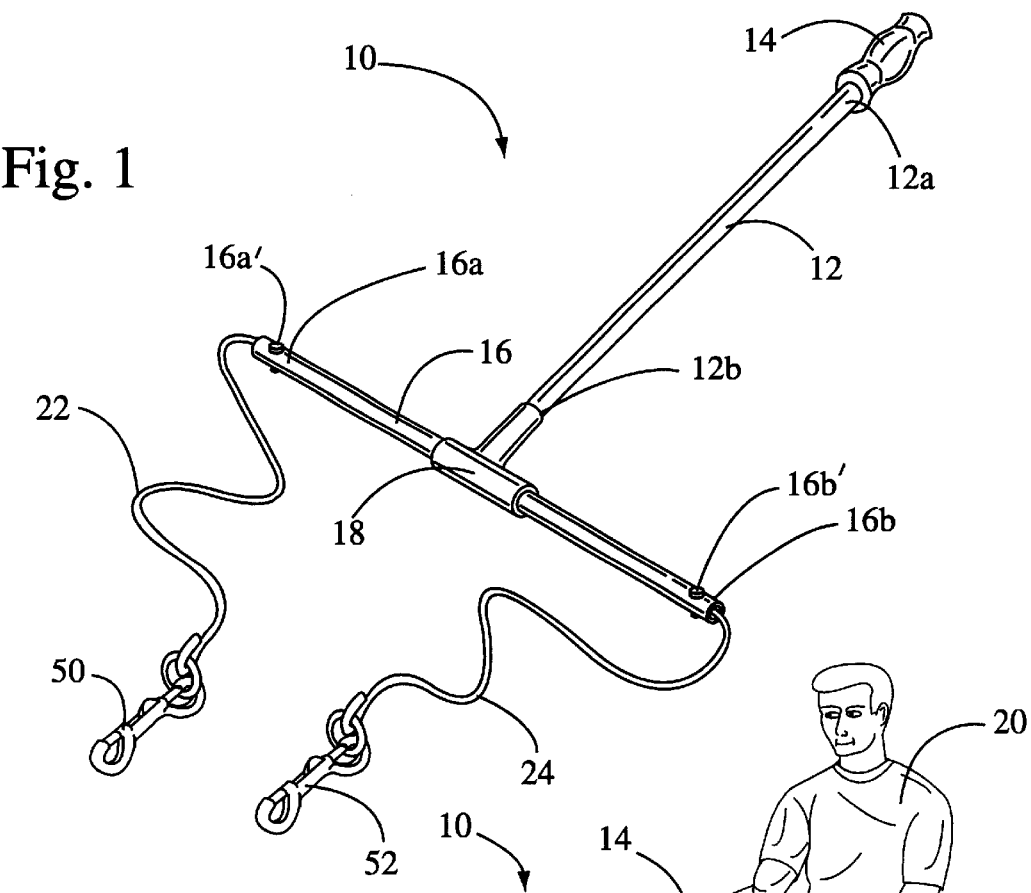
FIG. 1 is a perspective view of a multiple animal-walking device constructed in accordance to a preferred embodiment of the present invention.

Referring now to the figures, and initially to FIG. 1, there is perspectively illustrated an apparatus 10 for controllably walking two (2) pets simultaneously. As illustrated, the device 10 comprises an elongate shaft portion 12 having a proximal end 12a and a distal end 12b. Formed upon the proximal end 12a is a hand or a grip member 14 which facilitates handling of device. Attached to the distal end 12b of the elongate member 12 is a cross-bar member 16, the latter having first and second ends 16a, 16b. Preferably, in order to provide balance in handling the device 10, the elongate member 12 is affixed or otherwise formed to the midpoint of cross-bar 16, via tube member 18, to thus define a generally T-shape, as shown.

As will be appreciated by those skilled in the art, the device 10 may be formed from a variety of materials, including but not limited to metal, wood, and/or plastic. Additionally, the device 10 may be formed from separate components, namely elongate member 12, cross bar 16 and interconnecting tube member 18 as shown, or alternatively may be formed as a unitary structure with the elongate member 12 being integrally formed with the cross bar 16.

As will further be appreciated by those skilled in the art, although depicted as having a generally T-shape, the device 10 of the present invention may take a variety of alternative configurations. In this regard, it will be understood that the device 10 may be formed to have a generally Y-shape or a generally U-shape. Still further, for reasons discussed more fully below, the device 10 of the present invention may be formed to have a generally fork-shape configuration to facilitate the handling of three (3) or more pets that are simultaneously walked together.

To enable the device 10 to be connected to the pets bound thereby, there is provided dedicated leash members 22, 24 extending from the opposed ends 16a, 16b of the cross bar 16. As illustrated, the distal-most ends of the leash members 22, 24 are provided with conventional clasped devices 50, 52.

Figure 2:
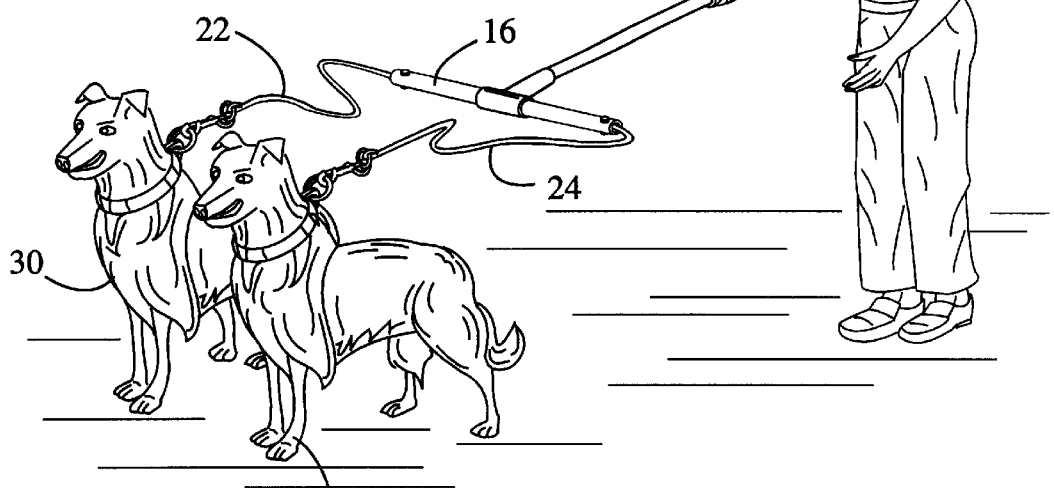
FIG. 2 is a perspective view of a multiple animal-walking device of the present invention as utilized by an individual to walk two dogs simultaneously.

With respect to the operation of the device 10, there is depicted in FIG. 2 an individual 20 utilizing the same. As shown, dedicated leash members 22, 24 extend from the opposed ends 16a, 16b of the cross bar 16 two (2) collars 26, 28 of the respective pets 30, 32 to be held thereby via clasps 50, 52. Specifically, first leash 22 is affixed to end 16a, via fastener 16a' to collar 26, via clasp 50. Similarly, leash 24 will connect end 16b, via hook 16b', to collar 28, via clasp 52.

Once the pets 30, 32 are secured to the device 10, the individual 20, by grasping the handle 14 on elongate member 12 thereof, may thus control the direction by which both animals are simultaneously walked. Advantageously, due to the secure attachment to the device 10, as well as the rigid structure thereof, the ability of each respective pet 30, 32 to stray from the individual 20 or the respective other pet is substantially restricted. Additionally, due to the configuration of the device 10, the spatial relationship between each respective pet 30, 32 and the individual 20 is maintained as a general constant. Accordingly, unlike prior art leashes that enable each respective animal bound thereby to freely move in any given direction, free animal movement is substantially minimized, if not completely eliminated, by the device 10 of the present invention.

As will further be appreciated by those skilled in the art, the device 10 of the present invention may be sized and configured pursuant to a multitude of variations to accommodate animals of varying sizes.

Along these lines, it will be recognized by those skilled in the art that the size of each of the aforementioned embodiments may be selected to accommodate particular size of a given pet to be walked thereby. In this regard, it is contemplated that the device 10 may be provided with telescoping pipe fittings to enable the length of the elongate member 12 and/or cross bar 16 to become longer or shorter depending on the size of the animal. For example, if German Shepherds are to be walked, the elongate shaft 12 and cross bar 16 can be expanded to assume a longer length and width, respectively. Alternatively, to the extent smaller dogs, such as Dachshunds or Chihuahuas are to be walked with the device 10 of the present invention, the shaft 12 and cross bar 16 may thus be correspondingly adjusted. Moreover, to the extent it is desired to walk three (3) or more pets, it will be appreciated that the device 10 of the present invention may be configured to have a generally fork-shape such that a multiplicity of outwardly extending members defining such fork provide means for attaching dedicated leash members to respective ones of the collars of each pet to be bound thereby.

Figure 3:
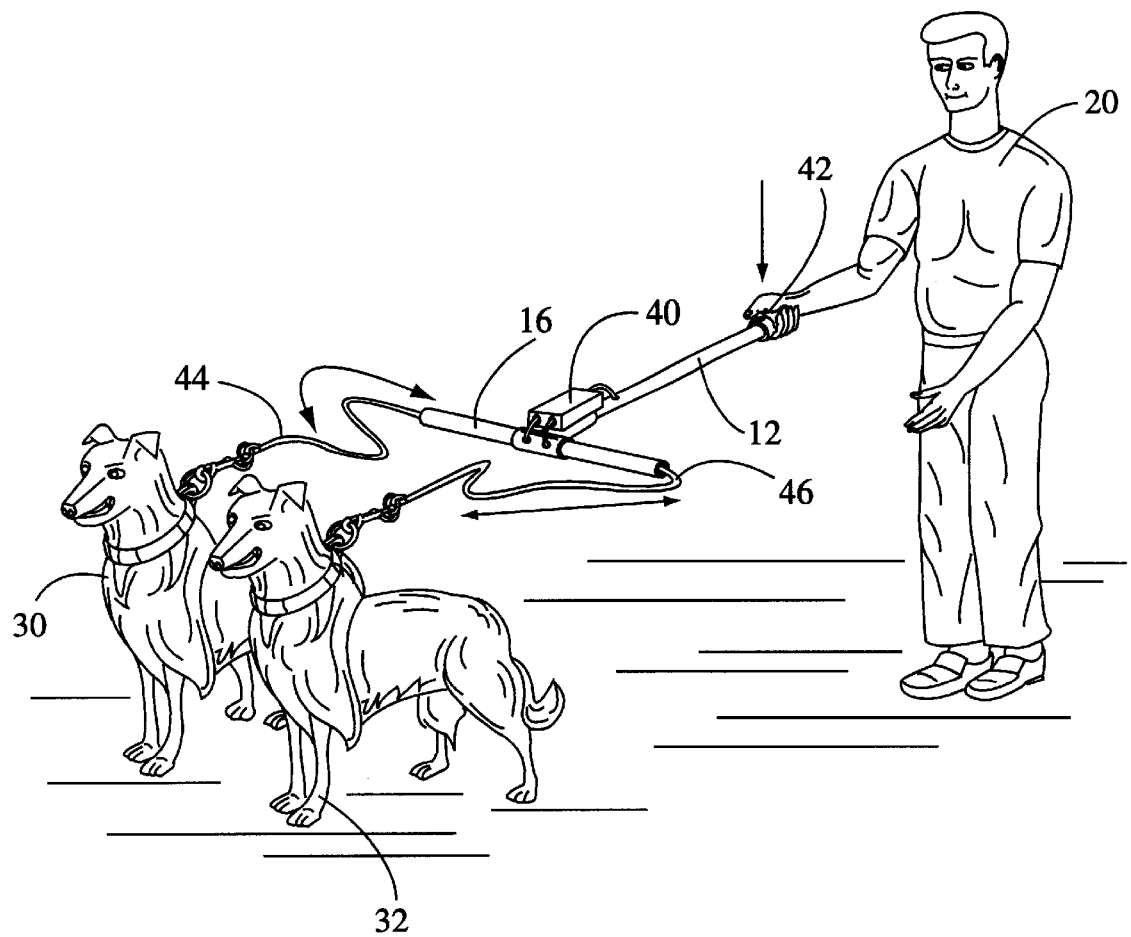
FIG. 3 is perspective view of a modified embodiment of the present invention depicting the device having two (2) retractable leash members formed thereon as utilized to walk two dogs simultaneously.
Figures 4, 5:
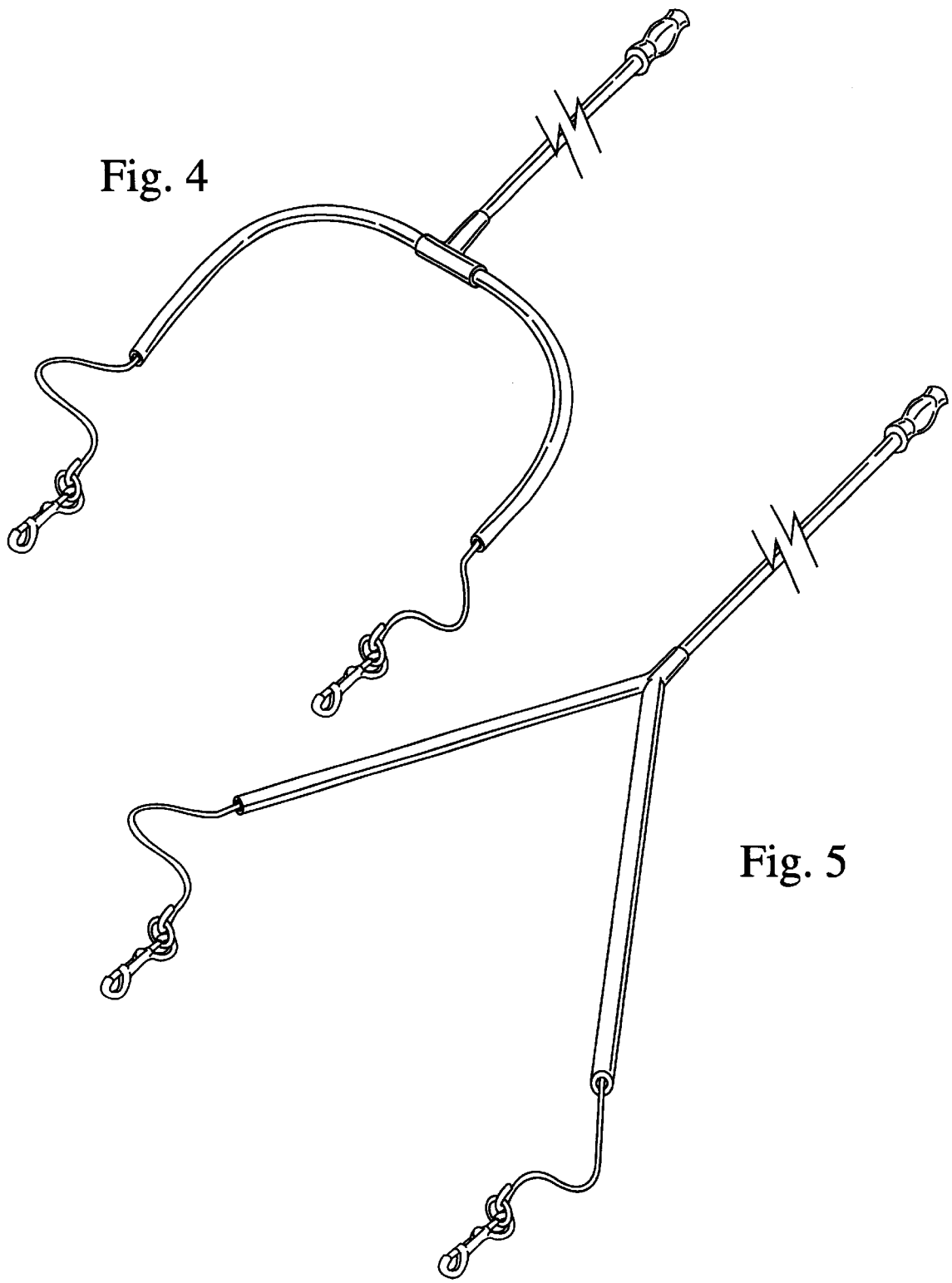
FIG. 4 is a perspective view of a modified embodiment of the present invention depicting the device having a generally U-shaped cross bar member.
FIG. 5 is a perspctive view of a modified embodiment of the present invention depicting the device having a generally Y-shaped cross bar member.

In addition to the foregoing alternative embodiments, there is depicted in FIG. 3 a further modification of the device 10 of the present invention. As illustrated, on elongate bar 12 is formed a retractable leash mechanism 40. As is well-known in the art, such retractable leash mechanism can enable a dedicated leash portion 44, 46, respectively extending therefrom to be selectively lengthened to thus enable the pet bound thereby to have a select degree of leeway to sway and move about. In this regard, the embodiment depicted thus enables each respective pet to be maintained in close proximity relative the device 10, or allowed more leeway to move about, as the pet may desire in less-crowded surroundings. To facilitate use of such retractable leash mechanism 40, there may be provided an actuation device 42 which enables the retraction mechanism 40 to be manually operated via the handle or grip 14 formed on the proximal end 12a of the elongate number 12. Such device 42 may likewise be utilized to selectively lengthen and/or shorten either leash length 44, 46 via mechanism 40, as may be desired to provide a necessary degree of control over a pet bound thereby at a given situation.

It is understood, however, that the same or equivalent functions and sequences may be accomplished by different embodiments and that they are also intended to be encompassed within the scope of this invention. For example, the leash members 22, 24 may be formed from any of a variety of materials, and may be either elastic or non-elastic in nature.

Although the invention has been described herein with specific reference to a presently preferred embodiment thereof, it will be appreciated by those skilled in the art that various modifications, deletions, and alterations may be made to such preferred embodiment without departing from the spirit and scope of the invention. Accordingly, it is intended that all reasonably foreseeable additions, modifications, deletions and alterations be included within the scope of the invention as defined in the following claims.

What is claimed is:

1. A device for walking two (2) animals simultaneously that maintain said animals in fixed proximity to one another comprising:
   a. a generally T-shaped member defined by an elongate shaft portion having first and second opposed ends and a cross-bar portion having proximal and distal ends, said cross bar being mounted upon a distal end of said elongate shaft portion;
   b. a grip member formed upon said proximal end of said elongate shaft portion;
   c. a first leash member bound to and extending from said first opposed end of said cross bar member;
   d. a second leash member bound to and extending from said second opposed end of said cross bar member; and
   e. wherein said first and second leash members are respectively attachable to a respective one of said animals.

2. The device of claim 1 wherein said elongate member is integrally formed with said cross-bar member.

3. The device of claim 1 wherein said elongate member and cross-bar member are fabricated from a material selected from the group consisting of metal, wood, and plastic.

4. The device of claim 1 wherein said device further comprises:
   a. a first leash retracting mechanism for selectively controlling the length of said first leash; and
   b. a second leash retracting mechanism for selectively controlling the length of said second leash.

5. The device of claim 4 wherein said device further comprises:
   a. a mechanism formed upon said proximal end of said elongate member for selectively actuating said first and second leash retraction mechanisms.

6. The device of claim 1 wherein said cross-bar member is formed to have an angled configuration such that said device assumes a generally Y-shape.

7. The device of claim 1 wherein said cross-bar member is formed to have a generally arcuate, U-shape.

8. The device of claim 1 wherein said device further comprises:
   a. at least two (2) prong members extending outwardly from said cross-bar member such that said device assumes a generally fork-shape, each respective prong having at least one (1) leash member bound thereto and extending therefrom.

9. The device of claim 8 wherein said device includes at least three (3) prongs extending from said cross-bar.

* * * * *